United States Patent [19]

Menashi et al.

[11] Patent Number: 5,654,357
[45] Date of Patent: Aug. 5, 1997

[54] DISPERSIBLE CARBONBLACK PELLETS

[75] Inventors: Jameel Menashi; Robert C. Reid, both of Lexington, Mass.

[73] Assignee: Cabot Cororation, Boston, Mass.

[21] Appl. No.: 405,444

[22] Filed: Mar. 16, 1995

Related U.S. Application Data

[63] Continuation-in-part of Ser. No. 273,875, Jul. 12, 1994, abandoned.

[51] Int. Cl.⁶ ........................................ C08K 3/00
[52] U.S. Cl. ........................... 524/495; 524/496
[58] Field of Search ...................... 524/495, 498

[56] References Cited

U.S. PATENT DOCUMENTS

| | | | |
|---|---|---|---|
| 3,353,974 | 11/1967 | Trimble et al. | 106/31 |
| 3,429,458 | 2/1969 | Walcott Jr. | 284/117 |
| 3,429,958 | 2/1969 | Walcott | 264/117 |

FOREIGN PATENT DOCUMENTS 133442  1/1979  Germany.

OTHER PUBLICATIONS

RaúE. Ayala et al., "The Relevance Of Powder/Liquid Wettability To The Cohesiveness Of Carbon Black Agglomerates" Part. Charact. 3, (1986) pp. 26–31.

M.M. Mednikov et al., "The Use Of PE In The Dry Pelletisation Of Carbon Black" International Polymer Science and Technology vol. 9, No. 1, (1992) pp. T/37 – T/39.

*Primary Examiner*—Edward J. Cain

[57] ABSTRACT

The disclosure relates to carbon black pellets containing 10 to less than 48 weight % organic compound, formed by agglomerating a carbon black with an organic compound having specified characteristics. Also disclosed is the use of such pellets as a masterbatch or a concentrate.

19 Claims, No Drawings

DISPERSIBLE CARBONBLACK PELLETS

This application is a continuation-in-part of application Ser. No. 08/273,875, filed Jul. 12, 1994, now abandoned.

This invention relates to the formation of carbon black pellets with a molten organic compound or mixture of organic compounds. The products can be used in many applications and are particularly useful for either producing black loaded masterbatches or for directly introducing carbon black into polymeric or elastomeric media.

BACKGROUND OF THE ART

As produced, carbon blacks are powdery materials with bulk densities ranging from about 0.02 to 0.1 g/cc and are termed fluffy blacks. Because of their low densities and large surface areas, the fluffy products are cohesive, have very poor conveying properties and are very dusty. They are, however, dispersible. Because of their poor handling properties, advantage of their excellent dispersibilities cannot be taken in many applications. For example, fluffy blacks cannot be fed in a controlled manner to standard dispersing devices, such as Banbury mixers, twin screw extruders or the like.

To improve their handling properties, the fluffy products are densified. For a given grade of black, handling properties tend to improve with increasing degrees of densification. Dispersibility, on the other hand, is progressively degraded as the extent of densification is increased. Thus there is a tradeoff between improvement in bulk handling and degradation in dispersibility. For this reason, the extent and means employed to densify the fluffy products depend on their intended uses.

The industry, in general, uses three basic methods to attain densification. These, in order of providing increased levels of densification, are: agitation or vacuum treatment of the fluffy product, dry pelletization and wet pelletization. Since the performance of carbon black in many applications depends on the degree of dispersion attained, the acceptable extent of densification achieved depends on the user's dispersion equipment and, especially, on the shearing stresses generated. The process of agitation or vacuum treatment yields a powder which cannot be bulk handled and is supplied only in a bagged form. Nevertheless, because this form of the product is much more dispersible than its more dense counterparts, it is used in applications where easy dispersion is mandatory.

Dry pelletization is conducted in rotating drums. Industrial drums have diameters of 6 to 10 feet and lengths of 20 to 40 feet which are rotated at 5 to 20 RPM. The fluffy product is fed continuously to one end of the drum. Tumbling of the dry black results in the formation of small round pellets. The process of pellet formation is facilitated by the use of seed pellets, which, typically, consist of part of the product pellets which are recycled to the feeding end of the drum. Generally, the products formed in dry drums have relatively low densities and, hence, are relatively weak and have low attrition resistances. As a consequence, conveying can cause pellet breakdown which leads to a degradation in their bulk handling properties. Many methods are available for enhancing pellet strengths. These methods include addition of small quantities of oil and binder.

Wet pelletizing is conducted in pin pelletizers. Such units consist of a cylinder which is 0.4 to 1.5 m in diameter and up to 3 to 4 m long. Along the axis of the unit is a rotating shaft which is fitted with a multitude of pins, typically, arranged in the form of helices with the pins extending almost to the cylinder wall. The rotational velocity of the shaft depends on the diameter of the unit and the intensity of pelletizing desired. Rotation speeds can range from 300 up to 1500 RPM. The fluffy black and water are continuously added to the unit. The combination of capillary forces generated by the water in the black-water mixture and the mechanical action of the pins results in the formation of spherical, wet pellets with diameters, mostly, in the range of 0.25 to 3 mm. The water/black ratio required in the pelletizing operation depends on the structure of the black and, in many cases, is in the range of 1:1. The wet pellets exiting the pelletizer are then dried in rotary driers. Because of the high moisture contents in the pellets, drying represents a costly unit operation.

Despite the reduction in pellet dispersibilities and the attendant costs of drying, pin pelletizing is extensively practiced because it yields more dense, attrition-resistant pellets than the dry process. Further, binders, such as lignosulfonates, sugars or molasses as well as additives such as polyoxyethylene nonionic surfactants, substituted polyethylene glycol, etc. can be easily added to the pelletizing water. These serve to strengthen or, when surfactants are used, strengthen and improve the dispersibilities of the dried pellets.

The industry has also attempted to improve the tradeoff between enhanced pellet strength and degradation in dispersibility by providing moisture-free, oil-containing pellets. A maximum of 8 weight % oil in the black can be tolerated without changing its hazard classification. Oil can be easily incorporated in a black by means of the dry pelletization process. At oil levels much above 15 weight %, the pellets have been characterized as being "too soft and mushy to handle well in bulk".

Aqueous emulsions of oil have been used to form oil-containing pellets in various mixing devices. It can be expected that, in most cases, drying will result in loss of oil by steam distillation and necessitate additional processing steps.

Pin pelletizing can also be accomplished with pure oil in place of water/oil emulsions. In such instances water removal by drying is not required so that loss of the oil will no longer occur. However, for pellet formation, the oil contents of pellets will be substantially larger than 8 weight %, necessitating a change in their hazard classification.

Another approach taken to improve the tradeoff between enhanced pellet strength and reduced dispersibility has been to pelletize carbon black with aqueous media containing latexes which are compatible with rubber. The resulting pellet compositions, after drying, were found to have superior handling and dispersibility properties in rubber applications. Other workers, as described in U.S. Pat. No. 4,569,834, have pelletized carbon black with aqueous dispersions of waxy polyalkalenes, such as polyethylene waxes, and also found that the dried pellets exhibited improved handling and dispersibility properties. In these cases, however, pelletizing is effected in the presence of water so that drying, a costly unit operation, has to be employed. Also, the additives must be either available as or formed into aqueous emulsions or dispersions. Further, they must be thermally stable at the maximum drying temperatures attained in the rotary dryers used in the industry. These factors limit the range of materials which can be used in the pelletizing operation. A further limitation is that the additive must be compatible with the medium in which it is used. Nevertheless, such pellet compositions, formed by pin pelletizing carbon black with aqueous emulsions and dispersions of various compounds, have utility.

Other workers have developed an improved agglomeration process wherein an aqueous slurry of carbon black is mixed with an oil having a softening temperature in excess of about 100° C.

Mednikov et al. used up to 5 weight % of molten high density polyethylene, having a melt temperature of 125° to 135° C., to strengthen dry process pellets. This disclosure is found in Mednikov, M. M., V. M. Osipov, I. G. Zaidman, V. I. Ivanovskii, S. V. Oreklov and A. I. Ryabinkov, "The Use of PE in Dry Pelletization of Carbon Black," International Polymer Science and Technology, Vol. 9, No. 1, T/37 (1982). The viscosity of such polymers are high with typical values exceeding 20 Pa·s at a shear rate of 10 $s^{-1}$ at 190° C. These workers introduced solid polyethylene into air-borne fluffy carbon black having a temperature of 180° to 210° C. It was claimed that the polymer melted and was then adsorbed onto the surface of the black. The black was subsequently dry pelletized at an unspecified temperature to give pellets which had mass pellet strengths which were 2 to 5 kg higher than those, about 8 kg, formed in the absence of the polyethylene. While the process of Mednikov et al. gives some enhancement in pellet strength, the gain in strength attained was relatively small. Further exemplification of the foregoing disclosure appears in East German Patent No. 133,442 covering this technology. It should be noted that in Example 1 of this patent it is stated that the polyethylene used had a molecular weight of 2600. This is inconsistent with the stated molecular weight range of 15000 to 150000 said to be useful for the practice of the invention. Furthermore, as stated in the patent, the molten polyethylene serves as a site for forming agglomerates (by adhesion of the black to its surface). This indicates that the molten polymer is viscous. Otherwise, the polyethylene, being present as a minor constituent (less than 5 weight %) would have migrated into the intra-aggregate pores. For this reason, it would appear that the stated molecular weight for the polyethylene in Example 1 is not a correctly stated value. This contention is supported by the data in the present application where it is established that no strength enhancement is attained when using a low viscosity melt at the levels utilized in East German Patent 133,442.

Another approach to form dispersible pellets with good bulk handling properties was taken by Wallcott in U.S. Pat. No. 3,429,958. Wallcott pelletized carbon black with a molten paraffin wax in a pin mixer. The resultant cooled pellets, containing about 50 weight % wax, were free-flowing and found to be more dispersible than conventional wet process pellets in ink media. In his work, Wallcott used HAF (DBP=102 cc/100 g), SAF (DBP=113 cc/100 g) and ISAF (DBP=114 cc/100 g) blacks as examples of furnace blacks. Wallcott stated that, for furnace blacks, the weight ratio of carbon black to wax must be in the order of about 50:50 and claimed that the ratio must lie between 50:50 to 30:70. Thus, the process requires the use of relatively high wax levels.

The process developed by Walcott represents a considerable advance in the art. However, for many applications the wax levels employed by Wallcot are excessive. In many applications there is a preferred wax level (e.g., for lubricity, mold release, gloss, improved mar resistance, etc.) above which product performance is degraded. The preferred wax level, often, is smaller than the black loading. Accordingly, use of pellets containing 50% or more wax to attain the desired black loading will, inevitably, result in the addition of more than the desired wax level leading to a degradation in performance and increased costs. For certain applications it is preferred that the wax level of the pellets always be less than 48% by weight. Moreover, as will be further described, the process of pin pelletization becomes progressively more difficult as the level of liquid wax is increased and, for many blacks, becomes impossible at a 48% wax level.

The difficulties encountered both in handling carbon black pellets and in pellet dispersion have resulted in the establishment of businesses which produce concentrated dispersions of carbon blacks in aqueous and non-aqueous media (often referred to as masterbatches or concentrates). The production of masterbatches in thermoplastic polymers is of special importance. In this application, pelletized black is dispersed in a heated, viscous thermoplastic material such as polyethylene, polypropylene, acrylonitrile-butadiene-styrene copolymer, ethylene vinyl acetate, etc. Dispersion is effected in standard dispersing equipment such as Banbury mixers or twin screw extruders or the like. For production of acceptable masterbatches, the formation of good quality dispersions is of critical importance. After the dispersion process is complete, the masterbatch is, for example, extruded and then sliced into pellets for shipment.

The loading of black in the pellets is, as implied by the name "concentrate", quite high and will depend on the structure of the black. Carbon black consists of aggregates composed of partially coalesced primary particles. The spaces between the primary particles form the intra-aggregate void or pore volume. Structure has been shown to be related to the average number of primary particles per aggregate. This is found in Medalia, A. I., "Morphology of Aggregates: 6. Effective Volume of Aggregates of Carbon Black From Electron Microscopy: Application to Vehicle Absorption and to Die Swell in Filled Rubber," J. Colloid and Interface Science, 32, 115 (1970). A measure of this volume can be found by evaluating the n-dibutyl phthalate absorption, DBP, of the black by means of the ASTM D 2414 procedure. This value represents a measure of the volume of liquid required to fill the intra- and inter-aggregate pores of the dispersed black at the capillary state. The carbon black aggregates, in the black-DBP mix at the capillary state, are taken to be close to their maximum packing fraction.

For economic reasons, high loadings of black in a masterbatch or concentrate are preferred. However, for rapid incorporation during let-down, the viscosity of the concentrate should not be very different from that of the medium in which it is being dispersed. Concentrate viscosity increases with pigment loading and approaches a high value as its solids content approaches that required for the pigment to attain its maximum packing fraction. Accordingly, to obtain acceptable viscosities, the black loading in a masterbatch will be less than that at which it attains its maximum packing fraction and, hence, contains little or no air. In other words, the black loading is less than that required to achieve the capillary state.

In contrast to conventional masterbatches, the pellets of this invention are formed at black loadings which exceed the capillary state so that they contain air. As a consequence, they can appear to be much more viscous than conventional masterbatches. The effect of air on viscosity, however, is mitigated in pressure rheometers because the high pressure employed can reduce the volume of voids between the black aggregates. Medalia and Sawyer have demonstrated that carbon blacks are highly compressible. This is discussed in Medalia, A. I., and R. L. Sawyer, "Compressibility of Carbon Black, Proc. Fifth Carbon Conference, 1961," Pergammon Press, N.Y., 1963, p. 563. The criterion that the pellets of this invention are formed on the "dry" side of the capillary state (i.e., they contain air) in agglomeration devices with molten organic compounds in the absence of water may be used to distinguish them from conventional masterbatches, such as those described in the literature and which, typically, are formed on the "wet" side of the capillary state (i.e., the masterbatch pellets are essentially void-free). The expressions "dry" side and "wet" side of the capillary state are used solely to indicate whether pellets comprising a black-organic compound mixture contain air or are air-free, respectively.

The maximum black content of a conventional masterbatch will depend on the maximum acceptable viscosity. For reasons already discussed, the volume of polymer in the masterbatch is substantially larger than that required to attain the capillary state as measured by the black DBP value. For the same masterbatch viscosity and for blacks with comparable surface areas, the loading that Can be achieved increases with decreasing black DBP.

Black dispersibility decreases as black surface area increases and/or its DBP decreases. Because of difficulties encountered in their dispersion (and depending on the application), blacks with low DBP values and very high surface areas are rarely used to form masterbatches. For example, for applications where jetness or UV protection is needed, the black must have a minimum surface area. To form acceptable concentrates with a black having a high surface area, a high DBP product may often be used in concentrate formation. Thus, practical considerations dictate that in masterbatch formation a compromise be struck between black loading and dispersion quality. For this reason, blacks with the lowest attainable DBP values are rarely used in the production of black masterbatches.

In spite of their costs, the market for black concentrates or masterbatches is substantial because the resulting products are dust-free, easily conveyed and much more easily dispersed in compatible thermoplastic media than conventionally pelletized blacks. Surprisingly, we have found that carbon blacks pelletized with a molten organic compound or a mixture of organic compounds which are solid at ambient temperatures, can be used in place of concentrates without significant loss in performance.

SUMMARY OF THE INVENTION

The present invention concerns the formation and use of free-flowing, attrition resistant, dispersible carbon black pellets. By taking advantage of these properties, the products can be used in place of conventional carbon black pellets in applications such as:

1) Forming carbon black loaded masterbatches.
2) Attaining higher black loadings in conventional masterbatches by using lower structure (i.e., lower DBP) blacks without increasing their viscosities or degrading the state of dispersion attained with the higher structure (i.e., higher DBP) products.
3) Replacing the use of conventional masterbatches for introducing carbon black into polymeric media.

Accordingly, in a first embodiment the present invention provides a carbon black pellet comprising carbon black and 10 to less than 48% by weight of an organic compound or a mixture of organic compounds, said pellet having been formed by agglomeration at a temperature above the melting point of the organic compound or mixture of organic compounds in the absence of water, wherein the organic compound or mixture of organic compounds has the following characteristics:

a) a melting point of at least 25° C. and, preferably, higher than 45° C., b) when molten and at the agglomeration temperature employed, exhibits less than 5% decomposition or degradation, c) when molten and at the agglomeration temperature employed, exhibits a viscosity below 2 Pa.s at a shear rate of 10 s$^{-1}$, and d) when molten, wets the carbon black. The agglomeration method used to form the pellet is preferably dry pelletization or pin pelletization. The organic compound or mixture of organic compounds is preferably at least one of a non-polymeric organic compound, an organic thermoplastic homopolymer, an organic thermoplastic copolymer, and a wax.

The present invention also provides a method of using a pellet according to the invention as a masterbatch or a concentrate.

Additional features and advantages of the invention are set forth in the detailed description which follows or may be learned by the practice of the invention. The objectives and advantages of the invention will be realized and attained by the various embodiments described in the detailed description and pointed out in the claims.

DETAILED DESCRIPTION OF THE INVENTION

The pellets of the present invention can be formed by agglomeration, either under conditions of violent agitation as in conventional continuous pin pelletizers or under much more gentle conditions as in dry drums. Accordingly, since the degree of agitation in most pelletizing devices, such as disc pelletizers, briquetting units, roll compactors, shear mixers, etc., are intermediate between those of dry drums and pin pelletizers, most agglomerating devices will be suitable, under appropriate conditions, for the practice of the present invention. For example, in the case of pin pelletizing, and as shown by Wallcott for paraffin wax, a molten organic compound or mixture of compounds can be used in place of water, traditionally employed as the cohesive fluid holding the wet pellets together. A liquid is regarded as wetting when its contact angle with the solid is less than 90°. In the case of dry drum pelletizing, the molten organic compound or compound mixture can be introduced in an analogous manner to the oils currently employed. The contents of the drum, however, must be maintained at temperatures above the melting point of the meltable compound or compound mixture.

The organic compound or compound mixture used in the pelletizing process is preferably chosen so that it is compatible with the medium in which the pelletized product is to be dispersed. A compatible compound is one which is soluble or miscible in the application medium at least at the level at which it is employed and, more preferably, has substantially greater solubility or miscibility than the level employed.

The molten organic compound or mixture of organic compounds, at the pelletizing temperature employed, must be resistant to decomposition or degradation. Suitable organic compounds or mixture of organic compounds are those which exhibit less than 5% decomposition or degradation when molten and at the agglomeration temperature.

Organic compounds or mixture of organic compounds which are suitable for use in forming the pelletized products of this invention must meet the following requirements:

1) They are solid at temperatures normally encountered during the conveying/handling/transport/storage of carbon black. Thus they should be solid at temperatures of at least 25° C. and, more preferably, higher than 45° C.

2) In the molten state and at the pelletizing temperature employed, they exhibit decomposition or degradation in an amount less than 5%.

3) In the molten state and at the pelletizing temperature employed, they exhibit a relatively low viscosity, below about 2 Pa.s at a shear rate of 10 s$^{-1}$, so that they can be atomized or transformed into small droplets.

4) They wet carbon black.

Preferably, the organic compound or mixture of organic compounds is also compatible with the intended use application.

Examples of suitable materials include, but are not limited to, simple organic compounds, polymeric materials, blends of simple organic compounds, thermoplastic homopolymers and copolymers, blends of homo- and co-polymers as well as blends of simple organic compounds with polymeric materials. The pelletized products, after cooling to a temperature below the melting point of the organic compound (s), consist of dispersible, free-flowing, hard, attrition resistant, non-dusting pellets which have excellent dispersibility characteristics. In other words, the tradeoff between improvement in bulk handling and degradation in dispersibility is substantially improved. In many instances the pelletized products of this invention can be used either to form concentrates or, more advantageously, directly in place of concentrates for introducing carbon black into polymeric media.

In a preferred embodiment, the organic compound or mixture of organic compounds is a polymeric wax such as polyethylene wax, an ethylene vinyl acetate wax and the like as well as mixtures of these waxes. Such waxes contemplated for use are well known in the art and are supplied commercially by various companies including Allied Signal, under the tradename of A-C® polyethylenes and A-C® copolymers, BASF Corp, under the tradenames of LUWAX® and Morttan Waxes, and Eastman Kodak, under the tradename of EPOLENE waxes. The waxes are used as mold release agents and/or lubricants in rubber, plastics and coatings applications. In addition, they function as pigment dispersants and are often employed in conventional black masterbatch formulations. They are used sparingly because, at larger than optimum levels, they can adversely affect medium properties and/or provide over-lubrication. In most applications, after let-down, the black loading will be significantly larger than that of the wax. The organic compounds or mixtures of organic compounds are discussed in more detail below.

The present invention involves the formation and use of hard, dust-free, attrition resistant carbon black pellets. They may be used for many purposes such as for forming concentrates or for use in place of conventional concentrates for introducing up to 5 weight percent carbon black into coating and thermoplastic polymeric media. The pellets of the present invention are formed by agglomeration, most conveniently, in conventional continuous pin pelletizers and dry drums using a molten organic compound or mixture of organic compounds as the cohesive fluid holding the pellets together in the absence of water. To avoid introducing undesired amounts of organic compound(s) in the intended use application, the pellets comprise carbon black and 10 to less than 50% by weight of the organic compound(s).

The volume of liquid (water, oil or molten organic compound) used in pellet formation has a large effect on the strength of the "wet" pellets. Ayala et al., have distinguished several pellet states at successively increasing liquid levels. This is described in Ayala, R. E., P. A. Hartley and G. D. Parfitt, "The Relevance of Powder/Liquid Wettability to the Cohesiveness of Carbon Black Agglomerates," *Part. Caract.*, 3, 26–31 (1986). The states are: 1) the dry pellet state; 2) the pendular state where the voids in a pellet are partially filled with liquid which forms bridges between adjacent aggregates; 3) the funicular state where adjacent pendular rings have coalesced into a continuous network of liquid interspersed with pockets of air; 4) the capillary state where the liquid just fills all the void spaces in the pellet so that the menisci at the pellet surface provide the maximum capillary suction pressure; and 5) the slurry state where the liquid level exceeds that required for the capillary state. The cohesive force, provided by a liquid which wets the black, increases with increasing liquid level and attains its maximum value at the capillary state. Beyond the capillary state there is a rapid diminution in cohesivity with small increases in liquid level. Wet pellet strength increases with increasing cohesivity.

In view of the very different nature of the compaction forces involved in pin and dry drum pelletization, the amounts of liquid required for pellet formation in the two processes may differ. The liquid requirements for these two operations as well as those required for other agglomeration devices are discussed in turn.

Pin Pelletizing

In pin pelletizing, the mechanical action of the rapidly moving pins serves to orient the black aggregates into closer proximity while the liquid provides the necessary cohesivity to hold the aggregates in the pellet together. Without the presence of a minimum amount of liquid, the force of the impacts of the rapidly moving pins with existing pellets would result in pellet fragmentation. In other words, a minimum degree of cohesivity is mandatory for successfully effecting pellet formation in a pin pelletizer. With carbon black sufficient cohesivity is attained when the liquid level in the pellets lies between those required to attain the pendular and capillary states. On the other hand, when the liquid level substantially exceeds that required to attain the capillary state, a wetted coherent mass is formed which inhibits pellet formation and product discharge from the pelletizer. In addition, the power level required to run the pelletizer increases rapidly with small increases in liquid content (beyond the capillary state) while the quality of the pellets discharged, in terms of sphericity and uniformity decreases.

Accordingly, for pellet formation in a pin pelletizer, the volume of liquid added to the black must be greater than that required for the onset of substantial pendular bond formation and less than that required to attain the capillary state. Preferably, pellet formation is effected in the pendular and/or funicular states where the resulting pellets contain air voids.

A good measure of the liquid level required to attain the capillary state can be obtained from the DBP value of the fluffy black (termed FDBP). This quantity provides a measure of the volume of DBP required to attain the capillary state in the black-DBP mixture and is comparable in magnitude with the volume of liquid required to attain the capillary state in a pellet. Accordingly, the weight percent liquid content of pellets exiting a pin pelletizer, $W_{liq,max}$ should be less than the quantity $$W_{liq,max} \leq \rho_{liq}[100(FDBP)]/[100 + \rho_{liq}(FDBP)] \tag{1}$$

where FDBP is expressed in cc/100 g black and $\rho_{liq}$ is the density of the molten compound(s) in g/cc. Since for most organic compounds $\rho_{liq} \leq 1.0$ g/cc, the criterion that $W_{liq,max}$ is less than 48% is always attained when pin pelletizing blacks with FDBP values equal to or smaller than 92 cc/100 g.

The onset of substantial pendular bond formation occurs when all the intra-aggregate pores are filled and large numbers of liquid bridges between the carbon black aggregates just begin to form. The aggregate is the smallest dispersible unit of carbon black. It is composed of coalesced primary particles. For non-porous primary particles, primary particle size is inversely proportional to black surface area. Between the primary particles, forming the aggregate, are voids or pores. Since the intra-aggregate pores are the smallest ones present in a pellet, they are filled first by a wetting liquid. Only after the intra-aggregate pore volume, also termed the occluded volume, is filled can a large number of cohesive, inter-aggregate pendular bonds be formed.

Medalia has developed a procedure for estimating the occluded volume from DBP values. This is described in Medalia, A. I., "Effective Degree of Immobilization of Rubber Occluded within Carbon Black Aggregates," *Rubber Chemistry & Technology*, 45, (5), 1172 (1972). A measure of the occluded volume, $\phi$, on a cc/g carbon black basis, can be obtained using the relationship $$\phi = [(DBP) - 21.5]/127.0 \quad (2)$$

The DBP attained during the pelletization process will depend on the intensity of the pelletization process and will lie somewhere between the FDBP and the crushed DBP, CDBP, values. The CDBP is determined by the ASTM D 3493-93 procedure. Typically, the CDBP value is 15 to 25%, say 20%, smaller than the FDBP value. Thus, a measure of the minimum occluded volume is obtained by using the CDBP value in place of DBP in Equation (2), i.e., $$\phi = [(CDBP) - 21.5]/127.0$$

Since pendular bonds are required to provide the cohesivity necessary to hold the pellets together in a pin pelletizer, the minimum percent liquid content, $W_{liq,min}$, necessary for pin pelletization can be written as $$W_{liq,min} \leq \rho_{liq}(100\phi)/(1+\rho_{liq}\phi) \quad (3)$$

Thus, for example, for a black with a FDBP value of 92 cc/100 g black, the minimum level of molten organic compound required for pellet formation (assuming $\rho_{liq}=1.0$ g/cc and CDBP to be 73.6 cc/100 g carbon black) is computed to be 29.1%. Accordingly, for a black with a FDBP value of 92 cc/100 g black, the organic liquid content will be within the range of 29.1 to 48% and, under practical pelletizing conditions (where the pellets contain some voids and have a DBP which lies between the CDBP and the FDBP), the amount of organic compound in the pellets will be about 38.5 weight %. Moreover, as the FDBP value is reduced, the products will contain smaller amounts of the organic material.

Dry Pelletizing

As already noted, pellets are formed in dry drum under much less severe conditions than in pin pelletizers. As a consequence, the decrease in the FDBP is small. Moreover, pellets can be formed without the presence of a cohesive liquid. The resulting pellets, however, have low densities and are weak. Strength enhancement can be attained by the addition of a certain minimum level of a meltable organic compound or mixture of organic compounds. The extent of strength enhancement attained will depend on the amount of organic compound or mixture of organic compounds added. At low melt levels, the bulk of the liquid moves to the intra-aggregate zones and little strength enhancement is attained. As the amount of molten organic compound or mixture of organic compounds added is increased, some strength enhancement results in spite of incomplete filling of the intra-aggregate pores. This strength enhancement occurs because some of the aggregates forming the pellet are in sufficiently close proximity to each other that some pendular bond formation takes place. As will be shown, some pellet strength enhancement can occur at molten organic addition levels as low as 10 weight %.

A preferred means for effecting dry pelletization is to first form a uniform mix of the fluffy black with the desired molten organic compound(s). Such mixtures can be formed, for example, by continuously feeding the fluffy black and the molten organic material to a grinder or other high intensity milling device. More preferably, when the molten compound (s) level is below that required to attain the pendular state, the fluffy black and the atomized molten material can be mixed in a conventional continuous pin pelletizer. Thereafter, the fluffy black/organic compound mixture can be fed to a heated drum together with recycled product pellets.

Alternate Pelletizing Procedures

As noted previously, alternate pelletizing procedures can be used to produce the products of this invention. The only limitations are that pelletization is effected in the absence of water and that the amount of molten organic material employed be more than 10 and less than 48 weight % of the pelletized composition. Particularly favored alternate means of pelletizing include the use of disc pelletizers and one of the various compacting devices.

Suitable Meltable Compounds

Organic compounds or mixture of compounds which are suitable for use in forming the products of this invention must have the following characteristics:

1) They are solid at temperatures normally encountered during the conveying/handling/transport/storage of carbon black. Thus they should be solid at temperatures of at least 25° C. and, more preferably, higher than 45° C.

2) In the molten state and at the pelletizing temperature employed, they exhibit decomposition or degradation in an amount less than 5%.

3) In the molten state and at the pelletizing temperature employed, they exhibit a relatively low viscosity, below about 2 Pa.s at a shear rate of 10 $s^{-1}$, so that they can be atomized or transformed into small droplets.

4) They wet carbon black.

Preferably, the organic compound or mixture of organic compounds is also compatible with the intended use application.

Examples of suitable organic compounds include simple organic compounds, polymeric materials, blends of simple organic compounds, thermoplastic homopolymers and copolymers, blends of homo- and co-polymers as well as blends of simple organic compounds with polymeric materials and mixtures thereof. Preferred polymeric compounds are:

1) Ethylene homopolymers or copolymers with at least one of the monomers consisting of butene, hexene, octene, norbornene, vinyl acetate, acrylic acid (present as acid or ionomer), methacrylic acid (present as acid or ionomer), alkyl ($C_1$ to $C_9$) acrylate, maleic anhydride, monoester of maleic acid and carbon monoxide.

2) Propylene homopolymers (atactic, isotactic and syndiotactic forms) and copolymers with ethylene; polynorbornene; polyoctenamer.

3) Styrene homopolymers or copolymers with at least one of the following: α methyl styrene, vinyl toluene, acrylonitrile, butadiene, maleic anhydride, indene, coumarone and alkyl acrylates.

4) Polyethylene glycols; ethylene oxide and propoyene oxide homopolymers and random or block copolymers; ethoxylated or ethoxylated/propoxylated phenols, alkyl phenols, aliphatic amines, aliphatic amides, polyhydric alcohols, polyhydric alcohol esters and polyamines.

5) Resins produced from the esterification of wood rosin, gum rosin, tall oil rosin, abietic acid (or their hydrogenated derivatives) with a polyhydric alcohol selected from ethylene glycol, glycerol or pentaerythritol.

6) Condensation products of a dimer acid with a diol or diamine; polycaprolactone or polycaprolactam.

Especially preferred are the polymeric materials which have relatively low molecular weights so that they melt and form low viscosity liquids at reasonably low temperatures such as polyethylene, polyethylene-polybutene, ethylene-acrylic acid and ethylene-vinyl acetate waxes available commercially. The organic compounds may also contain small amounts of additives such as dispersants, UV stabilizers and anti-oxidants. The additives may be either solid or liquid at ambient temperatures as long as the total composition employed in the pelletizing operation has the stipulated characteristics. The potential number of organic compounds or mixture of compounds which satisfy the stipulated characteristics is large.

Agglomerating or pelletizing can be carried out in conventional pelletizers or compacting devices provided that the following requirements are fulfilled:

1) A means is provided for melting and introducing the desired molten compound or mixture of compounds into either the unit employed to distribute it evenly on the fluffy black or in the pelletizer.
2) The black temperature is at or above the melting point of the organic compound or mixture of organic compounds.
3) The pelletizer contents are maintained at or above the melting point of the organic compound or mixture of organic compounds.
4) A means is provided for cooling the agglomerated or pelletized product to a temperature below the solidification temperature of the molten material.

The agglomerated or pelletized product, after cooling to a temperature below the melting point of the organic compound or mixture of organic compounds, consists of dispersible, free-flowing, hard, attrition resistant, non-dusting pellets preferably having mean sizes in the range of 0.2 to 6.0 mm. Strength enhancement occurs because the pendular and funicular bonds have solidified and form solid inter-aggregate bridges. Such bridges are much stronger than the van der Waals attractive forces and, are rigid and, in many cases, stronger than liquid bridges present in oil pellets.

The following examples are intended to illustrate, not limit, the present invention.

Experimental

Batch Pin Pelletizing

Sample preparation was conducted in an 8-inch diameter by 8-inch long batch pin pelletizer. The central shaft was fitted with fourteen 0.5-inch diameter pins which extended almost to the cylinder wall. The shaft speed could be varied from 100 up to about 1700 RPM. The cylindrical wall of the unit could be heated electrically to temperatures up to 300° C.

Pelletizing was effected by placing a known weight of black (typically, 400 g) in the pelletizer. Thereafter, the fluid was, generally, added while the rotor was turning at 50 to 100 RPM. When water was the cohesive fluid, it was sprayed into the pelletizer via an atomizer. When a molten organic compound or mixture of compounds represented the cohesive fluid, it was poured into the preheated pelletizer (wall temperature of 200° to 300° C.) when the black temperature approached that required to melt the organic compound(s). It should be noted that in batch pelletizers the temperature of the black need not be at or above the melting temperature of the molten compound(s). In the presence of the compound and at the high pelletizer wall temperatures used here, the temperature of the mix rapidly rises to temperatures above the melting temperature of the organic compound(s). After addition of the molten material, the pelletizer RPM was adjusted to the desired value. Typically, pellet formation occurred within three minutes with the organic fluids and within 3 to 10 minutes with water.

Continuous Pin Pelletizing

Hot fluffy black having a surface area of 43 $m^2/g$ and a FDBP of 135 cc/100 g was fed at the rate of about 180 lbs/hour to a 10-inch diameter 61-inch long pelletizer. Molten wax, at a temperature of 175° C., was added simultaneously via a pressure spray to the pelletizer. The walls of the pelletizer were maintained at a temperature of about 175° C. The rotor, fitted with about 120 pins arranged in the form of a double helix, was rotated at specified RPM's.

Dry Drum Pelletization

Dry drum pelletization was effected in a 15.5-inch diameter by 24-inch length drum rotated at 20 to 35 RPM. The drum was maintained at a temperature of 55° to 65° C. The requisite amount of molten organic was mixed with the fluffy black in a blender. The resulting heated powder, containing 300 g of carbon black, was added over a period of about 45 minutes to a 200 g bed of seed pellets in the rotating drum. The pelletization process was complete after about 4 hours. Initially, the seed pellets consisted of pellets formed in a pin pelletizer. In the second round of pelletization, product from the first round was used as seed pellets. Finally, in the third round of pelletization, product from the second round was used as seed. Under these conditions, the final product (from the third round) contains only 6.4% of the original seed material.

Product Evaluation

Pellet strength properties were evaluated by means of mass pellet strength (ASTM D1937-93), individual pellet crush strength (ASTM D3313-92) and pellet attrition (using a modification of ASTM D 4324) tests. The modification of the ASTM D4324 test consisted of determining the total amount of dust generated after shaking the sample for 5 and 20 minutes and not the difference in the amounts of dust generated between the two stated times, as required by the test. Tap densities were determined by placing a known weight of pellets, screened to a narrow size distribution, in a graduated cylinder and then tapping the sample to a constant volume.

Dispersibility was evaluated both in plastic (ABS) and liquid media. Details of the procedures used are given later.

The acrylonitrile butadiene styrene (ABS) copolymer was GPM 5600-0000 manufactured by GE Plastics and was obtained from Polymerland Inc. The masterbatches for carbon blacks in ABS were compounded in a 1.6 liter capacity Banbury mixer at 20 to 50 weight % carbon black loadings. Apparent melt viscosities were measured on a Monsanto Processibility Tester (MPT) with a capillary having a length to diameter ratio of 20:1 and a 1.5 mm diameter. The apparent viscosities were measured at a shear rate of 600 $s^{-1}$ at a temperature of 230° C.

The masterbatches and wax containing pellets were letdown on a Battenfeld BA 500 E injection molder to a 1% loading of the black in ABS. The mass tone color, L* value, of the letdown was measured using a Hunter LabScan, (0,45) degree geometry, 10 degree observer, CIElab and D65 illuminant. The L* value declines as jetness (degree of blackness) increases.

Izod impact strength was performed according to ASTM D256. The dispersion ratings were determined using the Cabot Dispersion Classification chart, "Carbon Black Dispersion," Cabot Corporation Technical Report S-131. In this procedure the letdown is viewed at a 100 fold magnification and the sizes and numbers of undispersed units are visually compared against those in a standard chart. The sizes of the undispersed units increase with increase in the value of the number rating (from 1 to 6) and their numbers increase progressively from A to F.

Further experimental details are given in the Examples.

EXAMPLES

Experiments were conducted to demonstrate that carbon blacks with differing structure levels (as measured by their FDBP values) and surface areas can be readily pelletized with a variety of molten organic compounds or mixtures of organic compounds which satisfy the criteria set forth above. These studies were conducted in the heated batch pin pelletizer. Unless otherwise stated, 400 g of fluffy black was used in the pelletizing operation. The FDBP and surface areas of the blacks employed, the compositions and amounts of the organic compounds used, the agglomerating conditions employed and the black contents of the pellets are listed below.

Examples 1–6

Preparation of Carbon Black Pellets

In these examples the black used had a surface area of 140 $m^2/g$ and a FDBP of 114 cc/100 g black.

Example 1: The black was pelletized with 250 g AC-6 Polyethylene wax, melting point about 100° C., at 500 RPM for 3 minutes to give pellets containing 61.5 weight % black.

Example 2: The black was pelletized with 325 g AC-6 Polyethylene wax, melting point about 100° C., at 500 RPM for 3 minutes to give pellets containing 55.2 weight % black.

Example 3: The black was pelletized with a mixture of 245 g AC-6 Polyethylene wax and 25 g of a liquid polyisobutylene succinimide surfactant (Lubrizol L2165), melting point about 90° C., at 500 RPM for 3 minutes to give pellets containing 59.7 weight % black.

Example 4: The black was pelletized with a mixture of 293 g AC-6 Polyethylene wax and 32 g of a liquid polyisobutylene succinimide surfactant (Lubrizol L2165), melting point about 90° C., at 500 RPM for 2.5 minutes to give pellets containing 55.2 weight % black.

Example 5: The black was pelletized with 300 g of paraffin wax (Aldrich), melting point 53° to 56° C., at 500 RPM for 5 minutes to give pellets containing 57.1 weight % black.

Example 6: The black was pelletized with 375 g of paraffin wax (Aldrich), melting point 53° to 56°100° C., at 500 RPM for 1 minutes to give pellets containing 51.6 weight % black.

Examples 7–9

Preparation of Carbon Black Pellets

In these examples the black used had a surface area of 230 $m^2/g$ and a FDBP of 70 cc/100 g black.

Example 7: The black was pelletized with 180 g AC-6 Polyethylene wax, melting point about 100° C., at 800 RPM for 3 minutes to give pellets containing 69.0 weight % black.

Example 8: The black was pelletized with 216 g AC-6 Polyethylene wax, melting point about 100° C., at 800 RPM for 3 minutes to give pellets containing 64.9 weight % black.

Example 9: The black was pelletized with a mixture of 195 g AC-6 Polyethylene wax and 21 g of a liquid polyisobutylene succinimide surfactant (Lubrizol L2165), melting point about 90° C., at 500 RPM for 2 minutes to give pellets containing 64.9 weight % black.

Examples 10–14

Preparation of Carbon Black Pellets

In these examples the black used had a surface area of 220 $m^2/g$ and a FDBP of about 100 cc/100 g black.

Example 10: The black was pelletized with 375 g CARBOWAX® polyethylene glycol having a molecular weight of about 1000 (PEG 1000, Union Carbide), melting point about 38° C., at 500 RPM for 3 minutes to give pellets containing 51.6 weight % carbon.

Example 11: The black was pelletized with a mixture of 135 g CARBOWAX® PEG 1000, a polyethylene glycol having a molecular weight of about 1000 and 240 g of TERGITOL® XD, a surfactant based on a copolymer of ethylene and propylene oxides (Union Carbide), melting point above 30° C., at 500 RPM for 3 minutes to give pellets containing 51.6 weight % carbon.

Example 12: The black was pelletized with a mixture of 135 g CARBOWAX® PEG 1000, a polyethylene glycol having a molecular weight of about 1000 and 240 g of TERGITOL® XH, a surfactant based on a copolymer of ethylene and propylene oxides (Union Carbide), melting point above 30° C., at 500 RPM for 3 minutes to give pellets containing 51.6 weight % carbon.

Example 13: The black was pelletized with a mixture of 135 g CARBOWAX® PEG 1000, a polyethylene glycol having a molecular weight of about 1000 and 240 g of TERGITOL® XJ, a surfactant based on a copolymer of ethylene and propylene oxides (Union Carbide), melting point above 30° C., at 500 RPM for 3 minutes to give pellets containing 51.6 weight % carbon.

Example 14: The black was pelletized with 375 g of TERGITOL® XD, a surfactant based on a copolymer of ethylene and propylene oxides (Union Carbide), melting point above 30° C., at 500 RPM for 3 minutes to give pellets containing 51.6 weight % carbon.

Examples 15–16

Preparation of Carbon Black Pellets

In these examples the black used had a surface area of 42 $m^2/g$ and a FDBP of about 124 cc/100 g black. 350 g fluffy black was placed in the pelletizer.

Example 15: The black was pelletized with a mixture of 330 g polyethylene and polybutene waxes (15 and 85%, respectively, supplied by Allied Signal), melting point about 100° C., at 800 RPM for a few minutes to give pellets containing 51.5 weight % black.

Example 16: The black was pelletized with 348 g stearic acid, melting point about 71° C., at 800 RPM for 6 minutes to give pellets containing 50.1 weight % black.

Examples 17–18

Preparation of Carbon Black Pellets

In these examples the black used (had a surface area of 42 $m^2/g$ and a FDBP of about 124 cc/100 g black.

Example 17: The black was pelletized with a mixture of 85 g PICCOVAR L-30 and 85 g PICCO 6100 hydrocarbon resins, obtained from Hercules, having a melting point about 120° C., at 500 RPM for 2 minutes to give pellets containing 70.2 weight % black.

Example 18: The black was pelletized with a mixture of 100 g PICCOVAR L-30 and 100 g PICCO 6100 hydrocarbon resins, obtained from Hercules, having a melting point about 120° C., at 500 RPM for 1.3 minutes to give pellets containing 66.7 weight % black.

As indicated by Equation (1), the pellets of the foregoing examples are all formed on the "dry" side of the capillary state, meaning that they contain air.

Examples 19–22

Determination of Pellet Volumes

To further substantiate the assertion that the pellets contain air (i.e., voids), mercury porosimetry studies were conducted to determine the volumes of intra-pellet voids. The presence of such voids demonstrates that the pellets of the present invention contain air and, hence, are formed on the "dry" side of the capillary state. For these studies the pellets were formed in the batch pin pelletizer using either polyethylene (PE), Examples 19 and 20, or ethylene vinyl acetate (EVA), Examples 21 and 22, waxes. In all cases the pellets were formed at 500 RPM using a black having a fluffy DBP of 74 cc/100 g and a surface area of 210 $m^2/g$. Screened pellets having sizes larger than about 300 microns were used in the porosimetry studies.

A measure of the intra-pellet void volume was obtained by determining the volume of pores occupied by mercury at penetration pressures ranging from 24 to 33000 psia, corresponding to a pore size range of 8900 (8.9 microns) to 6.5 nm. Since the pellets had sizes which were substantially larger than the pore size range considered and since substantial mercury intrusion occurred at lower penetration pressures, it is probable that the actual intra-pellet pore volumes are somewhat larger than the cited values. The volumes of black, taking its skeletal density to be 1.86 g/cc, wax, taking its density to be 0.92 g/cc and air in the pellets were computed. The results obtained are summarized in Table 1 and show that the pellets of the present invention are formed on the "dry" side of the capillary state.

TABLE 1

| | | Pellet Volumes | | | | |
|---|---|---|---|---|---|---|
| Example Number | Wax Grade | Weight % Black | Pellet Volume, cc/g | | | Volume % Air |
| | | | Black | Wax | Air | |
| 19 | PE | 70.9 | 0.381 | 0.316 | 0.105 | 13.1 |
| 20 | PE | 69.0 | 0.371 | 0.337 | 0.057 | 7.5 |
| 21 | EVA | 70.9 | 0.381 | 0.316 | 0.120 | 14.7 |
| 22 | EVA | 69.0 | 0.371 | 0.337 | 0.082 | 8.6 |

Examples 23–26

Continuous Pin Pelletizing

Fluffy black with a FDBP of 140 cc/100 g and a surface area of 46 $m^2/g$ was pelletized with EVA wax in the continuous pelletizer at several rotor speeds. The samples obtained were characterized in terms of their wax contents (by thermogravimetric analysis), tap densities, mean size (by manual screening procedures), mass pellet strength, crush strength and attrition characteristics. The pellets were sufficiently strong that they exceeded the measuring capabilities of the instruments, 90 lbs for the mass pellet strength (MPS) test and 160 g for the pellet crush strength (PCS) test. The results obtained are shown in Table 2.

TABLE 2

| Properties of Continuous Pin Pelletized Samples | | | | | | |
|---|---|---|---|---|---|---|
| Example Number | RPM | Weight % Black | Mean Size, mm | Tap Density g/cc | 5 Minute Dust, % | 20 Minute Dust, % |
| 23 | 500 | 50.9 | 1.3 | 0.65 | 0.3 | 0.4 |
| 24 | ~750 | 57.9 | 0.82 | 0.63 | 3.8 | 4.0 |
| 25 | ~760 | 58.0 | 0.90 | 0.68 | 0.5 | 0.5 |
| 26 | 940 | 59.6 | 1.2 | 0.78 | 0.1 | 0.1 |

The results in the table show that as rotor RPM is increased, the black content of the pellets and the tap density tend to increase. This demonstrates that the wax content and densities of the pellets can be varied by changing the severity of the pelletizing operation. In all cases strong attrition-resistant pellets (as demonstrated by the small to negligible increases in the dust values between 5 and 20 minutes) were formed.

The results in Table 2 also show that as the rotor RPM increases, the wax level required to maintain the pellets in the pendular and funicular states decreases. When the rotor RPM was further increased to 1150 RPM while the wax addition rate was kept at about the same level as in Example 26, pelletization was effected on the "wet" side of the capillary state. As a result, the pelletizing operation became erratic, chunks rather than pellet were initially discharged, motorload requirements increased and, finally, caused a pelletizer shut down. Thus operation of the pelletizer on the "wet" side of the capillary state is not feasible.

Examples 27–32

Drum Pelletizing

Experiments were conducted to show that significant strength enhancement can be attained by pelletizing carbon black in the presence of a molten compound in a dry drum. For convenience, lauryl alcohol was chosen as the molten fluid because it has the low melting point of 25° C. and, hence, was easily maintained in the molten state during the drum pelletizing operation. It was then transformed to the solid state by cooling the pellets in a refrigerator prior to product characterization. The black employed had a FDBP of 74 cc/100 g and a surface area of 210 $m^2/g$.

For a black with a FDBP of 74 cc/100 g and for a fluid with a density of 0.82 g/cc (that of lauryl alcohol), calculations, using Equation (2) with DBP replaced by FDBP and Equation (3), show that the pendular state is attained when the pellets contain about 25 weight % lauryl alcohol. Dry drum studies were conducted by addition of lauryl alcohol treated fluffy black (300 g black plus varying amounts of alcohol) to 200 g seed pellets (for further details see experimental). The fluffy black contained 0, 9.1, 16.7, 23.1 and 28.6 weight % alcohol. Since dried wet process pellets, containing no lauryl alcohol, were initially used as the seed material, the lauryl alcohol content of the pellets after three cycles through the drum were calculated to contain 0, 8.6, 15.9, 22.2 and 27.6 weight % alcohol, respectively. Thus the highest alcohol level used just exceeded that required to attain the pendular state.

The resulting pellets after three pelletizing cycles were characterized in terms of their mean sizes, tap densities, mass pellet and individual pellet crush strengths. In addition, the product of the tap density and the fraction carbon in the pellets for each sample, termed the carbon density in the pellets, was computed. Finally, comparable properties for the pin pelletized pellets used as the initial seed material (Example 32) were also determined. The results obtained are listed in Table 3.

TABLE 3

Carbon Black Dry Drum Pelletized With Varying Levels Of Lauryl Alcohol

| Example Number | Weight % Alcohol | Weight % Black | Mean size mm | MPS lbs | Tap Density g/cc | *Carbon Density g/cc |
|---|---|---|---|---|---|---|
| 27 | 0.0 | 100 | 0.34 | 5 | 0.35 | 0.35 |
| 28 | 8.6 | 91.4 | 0.56 | 6 | 0.38 | 0.35 |
| 29 | 15.9 | 84.1 | 0.72 | 9 | 0.43 | 0.36 |
| 30 | 22.2 | 77.8 | 0.67 | 16 | 0.50 | 0.39 |
| 31 | 27.6 | 72.4 | 0.69 | 18 | 0.54 | 0.39 |
| 32[b] | 0.0 | 100 | 0.58 | 11 | 0.47 | 0.47 |

*Density of carbon in pellets
[b]Seed pellets formed by wet pelletizing in a pin pelletizer The results in the table indicate that at low lauryl alcohol content, below about 8.6 weight %, the drum pelletized products have low pellet strengths. As the lauryl alcohol content of the pellets increases above about 10 weight % there is a progressive increase in strength. As the pendular state (25.3 weight % lauryl alcohol) is approached and exceeded, the strengths of the drum pelletized products exceed that of the wet pelletized product (Example 32) even though the densities of the blacks in the pellets, on an alcohol free basis, are smaller than that formed by pin pelletizing. These results demonstrate that molten material can be used to strengthen pellets even when less compound than that required to attain the pendular state is employed.

Dispersibility Studies

The products of Examples 27 to 32 were incorporated into a standard news ink formulation. In all cases the formulation compositions were adjusted so that they contained identical amounts of lauryl alcohol. The products were incorporated into the news ink by vigorous agitation for 30 minutes by means of a dispersator and then the amount of undispersed material out of 5 g of pellets, classified as material greater than 325 mesh (greater than 44 microns) in size, was found. The percentage of the product dispersed, classified as material less than 325 mesh in size, was then found. The results obtained are presented in Table 4. They show that the dense, pin pelletized product (Example 32) contains the largest amount of residue and, hence, is the least dispersible product. The drum pelletized products exhibits comparable amounts of residues. Since the residue levels in the drum pelletized products are comparable and since their strengths increase with lauryl alcohol content, the present findings demonstrate that a more favorable tradeoff between enhancement in pellet strength and degradation in dispersibility can be attained by use of molten fluids to enhance pellet strengths.

TABLE 4

Dispersibilities Of Drum Pelletized Products

| Example Number | Weight % Lauryl Alcohol | Residue Weight g | Amount Dispersed % |
|---|---|---|---|
| 27 | 0.0 | 2.89 | 42 |
| 28 | 8.6 | 2.70 | 46 |
| 29 | 15.9 | 2.53 | 49 |
| 30 | 22.2 | 2.75 | 45 |
| 31 | 27.6 | 3.01 | 40 |
| 32 | 0.0 | 4.88 | 2.4 |

Comparative Examples 33–35

Effects of Black Loading in Conventional Masterbatches

Comparative experiments were conducted to determine the effects of black loading in conventional masterbatches on letdown performance. In these examples, a black with a FDBP of 114 cc/100 g black and a surface area of 140 $m^2/g$ was pelletized with water in a pin pelletizer, dried and then formed into masterbatches (in ABS) at black loadings of 20, 30 and 40%. The masterbatch viscosities were evaluated. The apparent viscosity of the unfilled polymer was 269 Pa.s. The products were then letdown to a 1% black loading and the jetness, impact strength and dispersion rating of the resultant letdowns evaluated. The results obtained are summarized in Table 5 and show that masterbatch viscosity increases with carbon black loading. As masterbatch viscosity increases, letdown performance, especially at the 40% loading in terms of jetness, dispersion rating and impact strength, is degraded.

TABLE 5

Effect of Black Loading on Letdown Performance

|  | Example 33 | Example 34 | Example 35 |
|---|---|---|---|
| [a]Black Loading, % | 20 | 30 | 40 |
| Viscosity, Pa · s | 523 | 821 | 1790 |
| [b]L* | 7.6 | 8.8 | 14.9 |
| Izod Impact, J/m | 260 | 260 | 200 |
| Dispersion Rating | 1C | 1B | 4D |

[a]Masterbatch results
[b]Letdown results.

Examples 36–37

Dispersibility Studies

To show that the products of the present invention are dispersible, the dispersion quality attained with some of them was compared against the dispersion quality attained with a conventional masterbatch. For these purposes, controls were formed from wet process batch pin pelletized products using the same grade of black as that used in Examples 1 to 6 and in Examples 33 to 35. The control pellets were formed by pelletizing 400 g of black in the batch pin pelletizer. The following weights of fluid were used to form pellets:

Example 36: 350 g water +40 g of isopropanol (added to aid wetting of the black).

Example 37: 400 g water +40 g isopropanol

The pellets of Example 36 and 37, containing 49.4 and 52.4 weight % water/isopropanol mixture, respectively, were dried at 150° C. Each dried product was formed into a masterbatch containing a 20 weight % black loading. The resulting samples were extruded, sliced into pellets and labelled Examples 36a (derived from the pellets of Example 36) and 37a (from Example 37). These masterbatch pellets, as well as the pellets of Examples 1 to 6, formed with PE wax or PE wax and polyisobutylene succinimide or paraffin wax with the same fluffy black, were letdown in ABS to attain a 1% black loading. The jetness values, impact strengths and dispersion ratings attained are presented in Table 6.

TABLE 6

Comparison of Performance Properties of Letdowns Formed From Conventional And Pin Pelletized Concentrates.

| Example No. | *Black Loading, % | L* | Impact Strength, J/m | Dispersion Rating |
|---|---|---|---|---|
| 36a | 20 | 7.5 | 280 | 2C |
| 37a | 20 | 7.7 | 280 | 1B |
| 1 | 61.5 | 8.5 | 190 | 2D |
| 2 | 55.2 | 8.1 | 250 | 1A |
| 3 | 59.7 | 8.7 | 200 | 2C |
| 4 | 55.2 | 8.0 | 220 | 1A |
| 5 | 57.1 | 8.8 | 120 | 5D |
| 6 | 51.6 | 8.9 | 150 | 5C |

*Black loading (by weight) in ABS masterbatch (Examples 36a or 37a) or in pelletized products.

The data in Table 6 demonstrate that the best letdown performances, in terms of jetness values (smallest L values) and impact strengths, were obtained with the conventionally formed but relatively dilute 20% black loaded masterbatches (Examples 36a and 37a). The results obtained are essentially identical with those presented in Table 5 at the same masterbatch loading. Accordingly, it is expected that the letdown performance which would be found for the more highly loaded (and more practical) masterbatches would follow the trends shown in Table 5.

The performance of the letdowns with pure PE wax, especially for the more lightly loaded product, Example 2, approached those found with the conventional 20% loaded masterbatches and probably would exceed that found at a 30% loading (see Table 5). Further, the apparent viscosities of samples of Examples 1 and 2 are in excess of 2100 and 860 Pa.s, respectively. These results demonstrate that pellets having relatively large apparent viscosities (compared to conventional masterbatches—see Table 5) can be used for letdown applications. Thus, these results show that products formed on the "dry" side of the capillary state can function as concentrates with acceptable letdown performance properties.

The letdown performances achieved with the combination of isobutylene succinimide and PE wax in the pellets, Examples 3 and 4, are quite similar to those found with the pure PE wax at comparable black loadings. In spite of the relatively large amounts of paraffin wax employed in pellet formation, the letdown performances of the products of Examples 5 and 6 are inferior to those found for the other Examples.

Example 38

Plant produced pellets formed from a carbon black with a FDBP value of 70 cc/100 g and a surface area of 230 m²/g were obtained. The pellets were produced by continuous pin pelletization using water as the cohesive fluid and then dried in the plant to give a pelletized product with DBP of 64 cc/100 g (Example 38). This product was dispersed in ABS to form a masterbatch containing 20 weight % black (Example 38a).

The letdown performance of the product of Example 38a is compared against those of the products of Examples 7, 8 and 9 in Table 7. All products were formed using a comparable fluffy black as feed.

TABLE 7

Comparison of Letdown Performance Of A Conventional Masterbatch With Pelletized Products Formed With Molten Fluids

| Example Number | 38a | 7 | 8 | 9 |
|---|---|---|---|---|
| *Black Loading, % | 20 | 69 | 64.9 | 64.9 |
| Impact Strength, J/m | 170 | 150 | 180 | 170 |
| Dispersion Rating | 3E | 4B | 3B | 4B |
| L* | 5.1 | 6.8 | 5.4 | 6.4 |

*Loading by weight in either the masterbatch or in the pellets

The jetness, impact strength and dispersion rating for the letdowns derived from the pellets of this invention approach that obtained using a lightly loaded, conventional masterbatch. The results in the table also suggest that pellet performance is enhanced as the level of PE wax used in the pelletizing operation is increased.

The amounts of molten organic compound employed in the pelletizing operation for the blacks used in Tables 6 and 7 were less than 50 weight % and were within the ranges given by $W_{liq,max}$ and $W_{liq,min}$. Moreover, as indicated previously and in agreement with the present findings, the amount of material needed for pelletization decreases with decreasing black structure.

Examples 39–40

The effects of pelletizing with water soluble molten fluids which are surface active agents was assessed. In these studies the dispersibilities of the products of Examples 10 to 14 were compared against those of the fluffy precursor used to make the pellets, Example 39, and the product pin pelletized with water, Example 40. In the latter case the wet pellets, containing 50 weight % moisture, were dried at 150° C.

As described above, the molten fluids employed consisted of polyethylene glycol and various surfactants based on copolymers of ethylene oxide and propylene oxide. The black employed had a fluffy DBP of about 100 and a surface area of about 220 m²/g. The surfactants all melted below 50° C. and were used, mostly, as blends with the higher melting PEG 1000 product. All blends contained 60 parts surfactant and 40 parts of PEG 1000. The molten products formed a single phase.

To assess dispersibility, the products of Examples 10 to 14 as well as the fluffy black, Example 39, and the conventionally pin pelletized black, Example 40, were dispersed in an aqueous medium containing surfactant and ethanol. Experience has shown that dispersed black is stable in this medium. In all cases 0.08 g of black was added to 200 ml of the aqueous medium. Each suspension was subjected to the same dispersing conditions by first stirring with a magnetic stirrer and then sonifying for 1, 5 and 15 minutes. At each stage of dispersion, the states of dispersion in the suspension were assessed by evaluating their optical densities, O. D., after further dilution with the suspending medium. The optical densities of the suspensions, normalized to a constant dilution level of 0.25 parts suspension and 8 parts suspending medium are summarized in Table 8.

TABLE 8

| | Optical Densities of Suspensions | | | |
|---|---|---|---|---|
| Example No. | O.D Stirred | O.D. 1' Sonified | O.D. 5' Sonified | O.D. 15' Sonified |
| 10 | 0.032 | 0.231 | 0.428 | 0.596 |
| 11 | 0.043 | 0.530 | 0.690 | 0.610 |
| 12 | 0.039 | 0.540 | 0.596 | 0.602 |
| 13 | 0.047 | 0.345 | 0.594 | 0.580 |
| 14 | 0.100 | 0.600 | 0.610 | 0.602 |
| 39[a] | 0.044 | 0.480 | 0.600 | 0.580 |
| 40[b] | 0.022 | 0.135 | 0.350 | 0.592 |

[a]Fluffy black
[b]Pin pelletized with water

The results in Table 8 demonstrate that after 15 minutes of sonification the optical densities of the suspensions have leveled out and, within the precision of the data, exhibit comparable values. This means that the samples are fully dispersed. After 5 minutes of sonification, the fluffy product, Example 39, as well as the surfactant containing samples, Examples 11, 12, 13 and 14, have similar optical densities which are comparable with those of the 15 minute sonified suspensions. Accordingly, these products are fully dispersed after 5 minutes of sonification. On the other hand, the water pelletized sample, Example 40, has the lowest optical density and, hence, is the least well dispersed product. The dispersibility of the sample pelletized with PEG, Example 10, is intermediate between the water pelletized and surfactant containing pellets. The optical densities at shorter dispersion times are consistent with the view that the dispersibility of the TERGITOL XD surfactant containing pellets, Example 14, is considerably better than that of the fluffy black, Example 39. Further, the products of Examples 11, 12 and 13 are comparable with that of the fluffy product. These results indicate that with the proper selection of the pelletizing fluid, strong pellets with good handling properties and with dispersibility equal to or better than that of the fluffy product can be obtained.

The claimed invention is:

1. A carbon black pellet comprising carbon black having a FDBP value less than or equal to 92 cc/100 g carbon as determined at ASTM D 2414 and 10 to less than 48% by weight of an organic compound or a mixture of organic compounds, said pellet having been formed by agglomeration at a temperature above the melting point of the organic compound or mixture of organic compounds in the absence of water, wherein the organic compound or mixture of organic compounds has the following characteristics:

a) a melting point of at least 25° C., b) when molten and at the agglomeration temperature employed, exhibits less than 5% decomposition or degradation, c) when molten and at the agglomeration temperature employed, exhibits a viscosity below 2 Pa·s at a shear rate of 10 s$^{-1}$ and d) when molten, wets the carbon black.

2. A carbon black pellet according to claim 1 wherein the melting point of the organic compound or mixture of organic compounds exceeds 45° C.

3. A carbon black pellet according to claim 1 wherein the organic compound or mixture of organic compounds is at least one of a non-polymeric organic compound, an organic thermoplastic homopolymer, an organic thermoplastic copolymer and a wax.

4. A carbon black pellet according to claim 1 wherein the pellet is formed by dry pelletization.

5. A carbon black pellet according to claim 1 wherein the pellet is formed by pin pelletization.

6. A carbon black pellet according to claim 1, wherein the molten organic compound or the mixture of molten organic compounds has a density ($\rho_{liq}$) which is less than or equal to 1.0 g/cc.

7. A carbon black pellet according to claim 5 wherein the minimum percent organic compound content of the pellet, $W_{liq,min}$, is equal to or exceeds the amount defined by the following equation:

$$W_{liq,min} \geq \rho_{liq}(100\phi)/(1+\rho_{liq}\phi)$$

wherein $$\phi = [(CDBP) - 21.5]/127.0,$$

$\rho_{liq}$ is the density of the molten organic compound or the mixture of molten organic compounds in g/cc, and CDBP is determined by ASTM D 3493 0 93.

8. The use of a pellet according to claim 1 as masterbatch or concentrate.

9. A method of using a carbon black pellet according to claim 1 as a masterbatch or concentrate.

10. A process for preparing a carbon black pellet comprising carbon black having a FDBP value less than or equal to 92 cc/100 g carbon as determined by ASTM D-2414 and 10 to less than 48% by weight of an organic compound or a mixture of organic compounds, comprising agglomerating a carbon black with an organic compound or mixture of organic compounds at a temperature above the melting point of the organic compound or mixture of organic compounds in the absence of water, wherein the organic compound or mixture of organic compounds has the following characteristics:

a) a melting point of at least 25° C.;

b) when molten and at the agglomeration temperature employed, exhibits less than 5% decomposition or degradation, c) when molten and at the agglomeration temperature employed, exhibits a viscosity below 2 Pa·s at a shear rate of 10 S$^{-1}$ and d) when molten, wets the carbon black.

11. A process according to claim 10 wherein the melting point of the organic compound or mixture of organic compounds exceeds 45° C.

12. A process according to claim 10 wherein the organic compound or mixture of organic compounds is at least one of a non-polymeric organic compound, an organic thermoplastic homopolymer, an organic thermoplastic copolymer and a wax.

13. A process for preparing a carbon black pellet comprising carbon black and 10 to less than 48% by weight of an organic compound or a mixture of organic compounds, comprising agglomerating a carbon black with an organic compound or mixture of organic compounds at a temperature above the melting point of the organic compound or mixture of organic compounds in the absence of water, wherein the organic compound or mixture of organic compounds has the following characteristics:

a) a melting point of at least 25° C.;

b) when molten and at the agglomeration temperature employed, exhibits less than 5% decomposition or degradation, c) when molten and at the agglomeration temperature employed, exhibits a viscosity below 2 Pa·s at a shear rate of 10 S$^{-1}$, and wherein the pellet is formed by dry pelletization in a rotating drum.

14. A process according to claim 10 wherein the pellet is formed by pin pelletization.

15. A process according to claim 10 wherein the minimum percent organic compound content of the pellet, $W_{liq,min}$, is equal to or exceeds the amount defined by the following equation:

$$W_{liq,min} \geq \rho_{liq}(100\phi)/(1+\rho_{liq}\phi)$$

wherein $$\phi=[(CDBP)-21.5]/127.0,$$

$\rho_{liq}$ is the density of the molten organic compound or the mixture of molten organic compounds in g/cc, and CDBP is determined by ASTM D 3493 0 93.

16. The carbon black pellet of claim 1, wherein said organic compound is an ethylene homopolymer or copolymer wherein at least one monomer is butene, hexene, octene, norbornene, vinyl acetate, acrylic acid, methacrylic acid, $C_1$–$C_9$ alkyl acrylate, maleic anhydride, or monoester of maleic acid and carbon monoxide; a propylene homopolymer or a propylene copolymer with ethylene; polynorbornene; polyoctenamer; a styrene homopolymer or copolymer wherein at least one monomer is alpha-methyl styrene, vinyl toluene, acrylonitrile, butadiene, maleic anhydride, indene, coumarone, or alkyl acrylate; or a polyethylene glycol.

17. The carbon black pellet of claim 1, wherein said organic compound is an ethylene oxide and propylene oxide polymer, an ethoxylated or ethoxylated/propoxylated phenol, an alkyl phenol, an aliphatic amine, an aliphatic amide, a polyhydric alcohol, a polyhydric alcohol ester, or a polyamine.

18. The carbon black pellet of claim 1, wherein said organic compound is a resin produced from the esterification of wood resin, gum resin, tall oil resin, abietic acid, or a hydrogenated derivative thereof, with a polyhydric alcohol selected from ethylene glycol, glycerol, or pentaerythritol.

19. The carbon black pellet of claim 1, wherein said organic compound is a condensation product of a dimer acid with a diol or diamine, a polycaprolactone, or a polycaprolactam.

* * * * *